W. A. GRAY.
WINDOW ENVELOP.
APPLICATION FILED AUG. 4, 1919.

1,358,436.

Patented Nov. 9, 1920.

INVENTOR
William A. Gray.
BY
W. B. Hutchinson.
ATTORNEY

UNITED STATES PATENT OFFICE.

WILLIAM A. GRAY, OF NEW PROVIDENCE, NEW JERSEY.

WINDOW-ENVELOP.

1,358,436.  Specification of Letters Patent.  Patented Nov. 9, 1920.

Application filed August 4, 1919. Serial No. 315,046.

*To all whom it may concern:*

Be it known that I, WILLIAM A. GRAY, a citizen of the United States, and a resident of New Providence, Union county, New Jersey, have invented a new and useful Improvement in Window-Envelops, of which the following is a full, clear, and exact description.

My invention relates to improvements in window-envelops, which is the trade name for that class of envelops in which a patch of transparent paper is pasted or otherwise secured to the face of the envelop so as to cover an opening therein in order that the address may be visible through the opening. Because of its convenience and the fact that it saves so much time in sending out mail matter, this envelop is very largely used. Notwithstanding this fact, a serious difficulty has developed in its wide use, owing to the fact that the transparent paper which is white or substantially white, reflects white rays to the eye in such a manner as to cause serious eye strain among post office employees and others who have occasion to read many addresses through the window of the envelop. This is probably due in a large measure to the fact that in the paper used there is a certain amount of non-transparent fiber in its composition, which impairs the easy reading of the matter behind it, and furthermore, the non-transparent particles in the paper reflect white light which causes the glare referred to and affects the eyes of the reader. The object of my invention is to overcome this difficulty and produce a window-envelop in which the patch, so called, while transparent so as to enable the address behind it to be easily visible, is tinted in a manner to prevent the reflection of white rays, and so make the reading much easier to the eye. Thus it will be seen that while the fiber referred to may remain in the paper, still the pigment or coloration will obviously relieve the white glare which has been found to be seriously objectionable. In my experiments I have found that a yellow tint best serves the purpose, does not in the least obscure the writing behind the patch, and relieves the eye strain referred to. This is on the same principle that yellow tinted glasses are often used to protect the eyes from exceptional white glare, and while I have found this color to be easy to the eye and to serve the purpose suitably, my invention is not limited to the particular tint, as blue, green, or possibly other shades might be used with beneficial effect.

Reference is to be had to the accompanying drawings forming a part of this specification, in which similar reference characters indicate corresponding parts in all the views.

Figure 1:
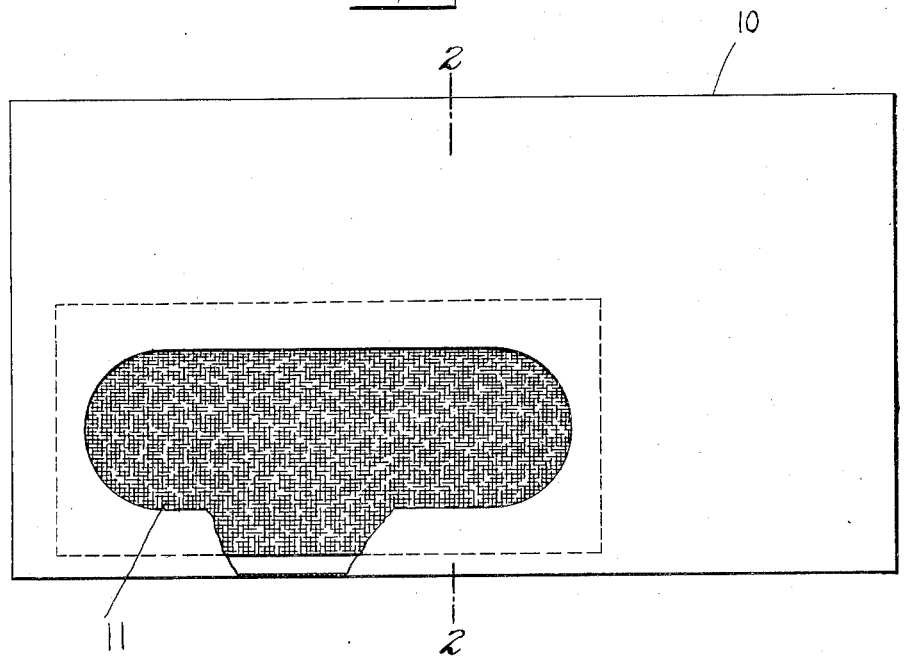
Figure 1 is a broken front view of a common type of window-envelop.
Figure 2:
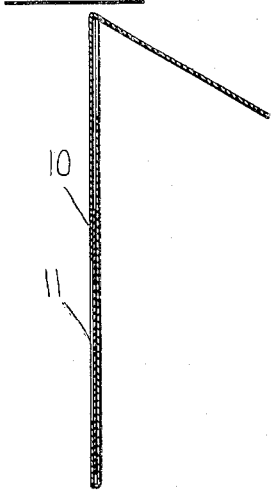
Fig. 2 is a cross section thereof.

The envelop 10 can be of any approved construction, and the mechanical structure of the envelop has nothing to do with the invention. It is shown with the conventional patch 11 covering the window or opening in the envelop, and this likewise can be secured in any usual or preferred way. In fact the drawing is shown merely to make it clear that my invention relates to the coloration of the patch which will relieve the eye strain.

As the drawing shows, in my improvement the patch is simply made of light yellow paper which is transparent or translucent, and which is applied in the customary or any preferred way. I have found that the writing behind such a patch is actually more easily visible than through the white paper, and as stated above, other tints can be used without affecting the principle of the invention.

In the foregoing description I have referred to tinted paper as a covering for the opening in the front of the envelop, but I wish it distinctly understood that the invention is not limited to paper, as other transparent fabric or other materials such as celluloid, collodion, gelatin, or the like, through which the printed matter of the inclosure can be seen, might be used if desired. I wish to further emphasize the fact that my invention relates to the tinting or coloring of the patch or cover for the envelop opening, so as to relieve the eye strain which has been found to be a serious matter where the white patch or covering is used.

I claim:

1. A window envelop having a window composed of transparent material of a yellow tint.

2. A window envelop having a window of transparent yellow paper.

3. A window-envelop having the opening therein covered by transparent material of a yellow tint.

4. A window-envelop having the opening therein covered by transparent yellow paper.

WILLIAM A. GRAY.

Witnesses:
JOHN E. SHEA,
WARREN B. HUTCHINSON.